US009468083B2

(12) United States Patent
Palvadi et al.

(10) Patent No.: US 9,468,083 B2
(45) Date of Patent: Oct. 11, 2016

(54) PLASMA GENERATION DEVICE ASSEMBLY, ARC MITIGATION DEVICE, AND METHOD OF ASSEMBLING A PLASMA GENERATION DEVICE ASSEMBLY

(71) Applicant: General Electric Company, Schenectady, NY (US)

(72) Inventors: Srinivas Naga Palvadi, Secunderabad (IN); Dharamveer Surya Parkash Bathla, Secunderabad (IN); Ravi Kumar, Bangalore (IN)

(73) Assignee: General Electric Company, Schenectady, NY (US)

( * ) Notice: Subject to any disclaimer, the term of this patent is extended or adjusted under 35 U.S.C. 154(b) by 806 days.

(21) Appl. No.: 13/663,871

(22) Filed: Oct. 30, 2012

(65) Prior Publication Data

US 2014/0116996 A1 May 1, 2014

(51) Int. Cl.
*B23K 10/00* (2006.01)
*H05H 1/46* (2006.01)
*H05H 1/52* (2006.01)

(52) U.S. Cl.
CPC ................. *H05H 1/46* (2013.01); *H05H 1/52* (2013.01); *Y10T 29/49117* (2015.01)

(58) Field of Classification Search
CPC ............ H05H 1/46; H05H 1/52; H05H 1/34; Y10T 29/49117
USPC ............ 219/121.37, 121.36, 121.52, 121.43, 219/121.57; 315/111.21
See application file for complete search history.

(56) References Cited

U.S. PATENT DOCUMENTS

| | | | | |
|---|---|---|---|---|
| 4,598,186 | A | 7/1986 | Cook et al. | |
| 5,502,612 | A | 3/1996 | Osterhout et al. | |
| 6,984,987 | B2 * | 1/2006 | Taylor et al. | 324/509 |
| 7,586,057 | B2 | 9/2009 | Sisson et al. | |
| 8,053,699 | B2 | 11/2011 | Roscoe et al. | |
| 2008/0239598 | A1 * | 10/2008 | Asokan et al. | 361/56 |
| 2009/0134129 | A1 | 5/2009 | Robarge et al. | |
| 2010/0301021 | A1 | 12/2010 | Bohori et al. | |
| 2013/0329325 | A1 * | 12/2013 | Ganireddy et al. | 361/56 |
| 2014/0158666 | A1 * | 6/2014 | Palvadi et al. | 218/156 |

OTHER PUBLICATIONS

McBride et al., "Arc Root Commutation From Moving Contacts in Low Voltage Devices", Transactions on Components and Pakaging Technologies, vol. 24, Issue 3, Sep. 2001.
Shea et al., "Dielectric Recovery Characteristics of a High Current Arcing Gap", Proceedings of the Forty-Seventh IEEE Holm Conference on Electrical Contacts, pp. 154-160, 2001.
Degui et al., "Experimental Investigation on Arc Motion of MCCB with Different Configurations of Arc Chamber using Optical Fiber Measurement System", pp. 341-346, Sep. 20-23, 2004.
Wang et al., "Simulation of the Venting Configuration Effects on Arc Plasma Motion in Low-Voltage Circuit Breaker", Transactions on Plasma Science, vol. 38, Issue 9, pp. 2300-2305, Sep. 2010.

* cited by examiner

*Primary Examiner* — Mark Paschall
(74) *Attorney, Agent, or Firm* — General Electric Company

(57) ABSTRACT

A plasma generation device assembly includes a base includes an interior portion and a top surface defining a plurality of apertures that extend through the top surface. The plasma generation device assembly also includes a plasma generation device and a plurality of coupling members. The plasma generation device is positioned on the top surface and is configured to emit ablative plasma when the plasma generation device is activated. The plurality of coupling members extends through the plurality of apertures and is configured to couple the plasma generation device to the top surface.

18 Claims, 6 Drawing Sheets

PLASMA GENERATION DEVICE ASSEMBLY, ARC MITIGATION DEVICE, AND METHOD OF ASSEMBLING A PLASMA GENERATION DEVICE ASSEMBLY

BACKGROUND OF THE INVENTION

The present application relates generally to power systems and, more particularly, to a plasma generation device assembly, an arc mitigation device, and a method of assembling the plasma generation device assembly.

Known electric power circuits and switchgear generally have conductors that are separated by insulation, such as air, or gas or solid dielectrics. However, if the conductors are positioned too closely together, or if a voltage between the conductors exceeds the insulative properties of the insulation between the conductors, an arc can occur. The insulation between the conductors can become ionized, which makes the insulation conductive and enables arc formation. In addition, arcs may occur as a result of degradation of the insulation due to age, damage to the insulation from rodents, and/or improper maintenance procedures.

An arc flash causes a rapid release of energy due to a fault between phase conductors, between a phase conductor and a neutral conductor, or between a phase conductor and a ground point. Arc flash temperatures can reach or exceed 20,000° C., which can vaporize the conductors and adjacent equipment panels. In addition, an arc flash or fault is associated with a release of a significant amount of energy in the form of heat, intense light, pressure waves, and/or sound waves, which can cause severe damage to the conductors and adjacent equipment.

In general, the fault current and the energy associated with an arc flash event are lower than a fault current and energy associated with a short circuit fault. Due to an inherent delay between closure of a relay and a circuit breaker clearing an arc fault, a significant amount of damage may occur at the location of the fault.

At least some known systems use an arc mitigation system to divert arc energy from the location of the arc flash or fault. The arc mitigation system has an arc containment device which often includes a plasma generation device that emits ablative plasma towards electrodes within the arc containment device or live terminals that terminate inside the containment device when the arc flash event is detected. The ablative plasma reduces or brakes a dielectric strength of the medium, or insulation, between the electrodes, and the medium breaks down such that an electrical arc is formed between the electrodes. The electrical arc diverts energy from the arc flash location until the source of the energy is abated or disconnected.

At least some known plasma generation devices are positioned within base structures or pedestals that position the plasma generation devices at a desired distance from the electrodes. As a result of the generation of the ablative plasma and the formation of the electrical arc between the electrodes, high pressure and/or high temperature gases are formed within the arc containment device. The high pressure and/or high temperature gases may at least partially escape the arc containment device through the plasma generation device and the pedestal, thus causing movement or displacement of the arc containment device and causing stress to one or more fastening components of the arc containment device. Such movement and/or stress may also cause damage to the plasma generation device, to the pedestal, and/or to other components of the arc containment device.

BRIEF DESCRIPTION OF THE INVENTION

In one aspect, a plasma generation device assembly is provided that includes a base including an interior portion and a top surface defining a plurality of apertures that extend through the top surface. The plasma generation device assembly also includes a plasma generation device and a plurality of coupling members. The plasma generation device is positioned on the top surface and is configured to emit ablative plasma when the plasma generation device is activated. The plurality of coupling members extends through the plurality of apertures and is configured to couple the plasma generation device to the top surface.

In another aspect, an arc mitigation device for use in discharging energy from an electrical event is provided that includes a containment chamber, a plurality of electrodes positioned within the containment chamber, and a plasma generation device assembly positioned within the containment chamber. The plasma generation device assembly includes a base including an interior portion and a top surface defining a plurality of apertures that extend through the top surface. The plasma generation device assembly also includes a plasma generation device and a plurality of coupling members. The plasma generation device is positioned on the top surface and is configured to emit ablative plasma such that an electrical arc is enabled to be formed between at least two of the plurality of electrodes to divert energy from the electrical event. The plurality of coupling members extends through the plurality of apertures and is configured to couple the plasma generation device to the top surface.

In yet another aspect, a method of assembling a plasma generation device assembly is provided that includes positioning a plasma generation device on a top surface of a cap, wherein the plasma generation device includes a plurality of terminals, sealingly coupling the plasma generation device to the cap using a plurality of coupling members, coupling a plurality of plasma generation device conductors to the plurality of terminals, and sealingly coupling the cap to a pedestal such that gases proximate the plasma generation device are prevented from entering the pedestal.

DETAILED DESCRIPTION OF THE INVENTION

Exemplary embodiments of a plasma generation device assembly, an arc mitigation device, and a method for assembling a plasma generation device assembly are described herein. The arc mitigation device includes a containment chamber, a plurality of electrodes positioned within the containment chamber, and a plasma generation device assembly positioned within the containment chamber. The plasma generation device assembly includes a hollow pedestal, a cap, and a plasma generation device. A plurality of plasma generation device conductors extend through the pedestal and are coupled to a trigger circuit. The trigger circuit is configured to activate the plasma generation device to discharge ablative plasma towards the electrodes within the containment chamber. The ablative plasma facilitates enabling an electrical arc to form between the electrodes to divert or discharge energy from an electrical fault. In an exemplary embodiment, the plasma generation device is sealingly coupled to the cap by a plurality of coupling members, and the cap is sealingly coupled to the pedestal. Accordingly, gases, such as air and/or other exhaust gases created by the electrical arc, are prevented from flowing through the pedestal and the cap, thus reducing or eliminating movement or displacement of the pedestal and/or the arc mitigation device during operation of the arc mitigation device.

Figure 1:
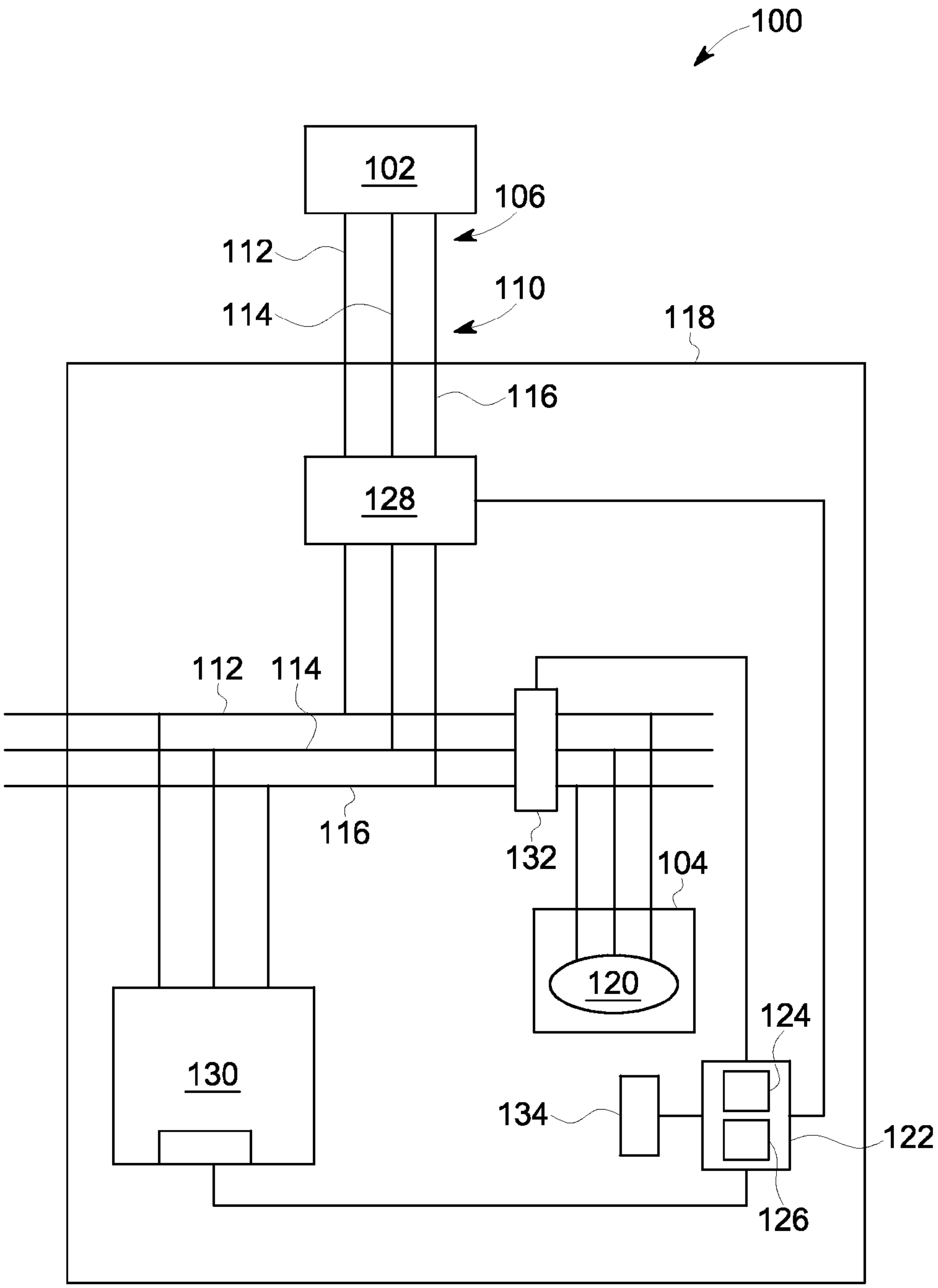
FIG. 1 is a schematic block diagram of an exemplary power distribution system.

FIG. 1 is a schematic block diagram of an exemplary power distribution system 100 that may be used to distribute electrical power (i.e., electrical current and voltage) received from an electrical power source 102 to one or more loads 104. Power distribution system 100 includes a plurality of electrical distribution lines 106 that receive current, such as three phase alternating current (AC), from electrical power source 102. Alternatively, power distribution system 100 may receive any number of phases of current through any suitable number of electrical distribution lines 106 that enables power distribution system 100 to function as described herein.

Electrical power source 102 includes, for example, an electrical power distribution network, or "grid," a steam turbine generator, a gas turbine generator, a wind turbine generator, a hydroelectric generator, a solar panel array, and/or any other device or system that generates electrical power. Loads 104 include, for example, machinery, motors, lighting, and/or other electrical and electromechanical equipment of a manufacturing, power generation, or distribution facility.

Electrical distribution lines 106 are arranged as a plurality of conductors 110. In an exemplary embodiment, conductors 110 include a first phase conductor 112, a second phase conductor 114, and a third phase conductor 116. First phase conductor 112, second phase conductor 114, and third phase conductor 116 are coupled to an equipment protection system 118 for transmitting a first phase of current, a second phase of current, and a third phase of current, respectively, to equipment protection system 118.

In an exemplary embodiment, equipment protection system 118 is a switchgear unit that protects power distribution system 100 and/or loads 104 from an electrical fault that may occur within power distribution system 100. For example, in one embodiment, equipment protection system 118 is a medium voltage switchgear unit that is operable, or rated to operate, at voltages between about 1 kilovolt (kV) and about 52 kV. More specifically, equipment protection system 118 electrically disconnects loads 104 from electrical distribution lines 106 (and from electrical power source 102) to interrupt current if an arc flash event 120 is detected. Alternatively, equipment protection system 118 is any other protection system that enables power distribution system 100 to selectively prevent electrical current from flowing to loads 104.

As used herein, an "arc flash event" refers to a rapid release of energy due to a fault between two or more electrical conductors. The rapid release of energy may cause pressure waves, metal shrapnel, an increased temperature, acoustic waves, and/or light to be generated proximate the fault, for example, within equipment protection system 118 and/or power distribution system 100.

In an exemplary embodiment, equipment protection system 118 includes a controller 122 that includes a processor 124 and a memory 126 coupled to processor 124. Processor 124 controls and/or monitors operation of equipment protection system 118. Alternatively, equipment protection system 118 includes any other suitable circuit or device for controlling and/or monitoring operation of equipment protection system 118.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Equipment protection system 118 includes a circuit interruption device 128 coupled to first phase conductor 112, second phase conductor 114, and third phase conductor 116. Circuit interruption device 128 is controlled or activated by controller 122 to interrupt current flowing through first phase conductor 112, second phase conductor 114, and third phase conductor 116. In an exemplary embodiment, circuit interruption device 128 includes a circuit breaker, contactor, switch, and/or any other device that enables current to be controllably interrupted by controller 122.

An arc mitigation system 130, or electrical fault mitigation system 130, is coupled to circuit interruption device 128 by first phase conductor 112, second phase conductor 114, and third phase conductor 116. In addition, controller 122 is communicatively coupled to arc mitigation system 130.

In an exemplary embodiment, equipment protection system 118 also includes at least one first, or current, sensor 132 and at least one second sensor 134. Second sensor 134 may include, without limitation, an optical, acoustic, voltage, and/or pressure sensor. Current sensor 132 is coupled to, or positioned about, first phase conductor 112, second phase conductor 114, and third phase conductor 116 for measuring and/or detecting the current flowing through conductors 112, 114, and 116. Alternatively, a separate current sensor 132 is coupled to, or positioned about, each of first phase conductor 112, second phase conductor 114, and third phase conductor 116 for measuring and/or detecting the current flowing therethrough. In an exemplary embodiment, current sensor 132 is a current transformer, a Rogowski coil, a Hall-effect sensor, and/or a shunt. Alternatively, current sensor 132 may include any other sensor that enables equipment protection system 118 to function as described herein. In an exemplary embodiment, each current sensor 132 generates one or more signals representative of the measured or detected current (hereinafter referred to as "current signals") flowing through first phase conductor 112, second phase conductor 114, and/or third phase conductor 116, and transmits the current signals to controller 122.

Second sensor 134, in an exemplary embodiment, measures and/or detects an arc flash event by measuring one or more physical characteristics, such as an amount of light, an acoustic pressure, a reduction in the voltage of power distribution system 100, and/or a barometric pressure generated within equipment protection system 118 by arc flash event 120. Second sensor 134 generates one or more signals representative of the measured or detected physical characteristics (hereinafter referred to as "sensor signals") and transmits the sensor signals to controller 122.

Controller 122 analyzes the current signals and the sensor signals to determine and/or detect whether arc flash event 120 has occurred. More specifically, controller 122 compares the sensor signals and/or current signals to one or more rules or thresholds to determine whether the sensor signals and/or current signals contain indicators of arc flash event 120. If controller 122 determines that arc flash event 120 has occurred based on the sensor signals and/or the current signals, controller 122 transmits a trip signal to circuit interruption device 128, and transmits an activation signal to arc mitigation system 130. Circuit interruption device 128 interrupts current flowing through first phase conductor 112, second phase conductor 114, and third phase conductor 116 in response to the trip signal. Arc mitigation system 130 diverts and/or discharges energy from arc flash event 120 into arc mitigation system 130, as is described more fully herein.

Figure 2:
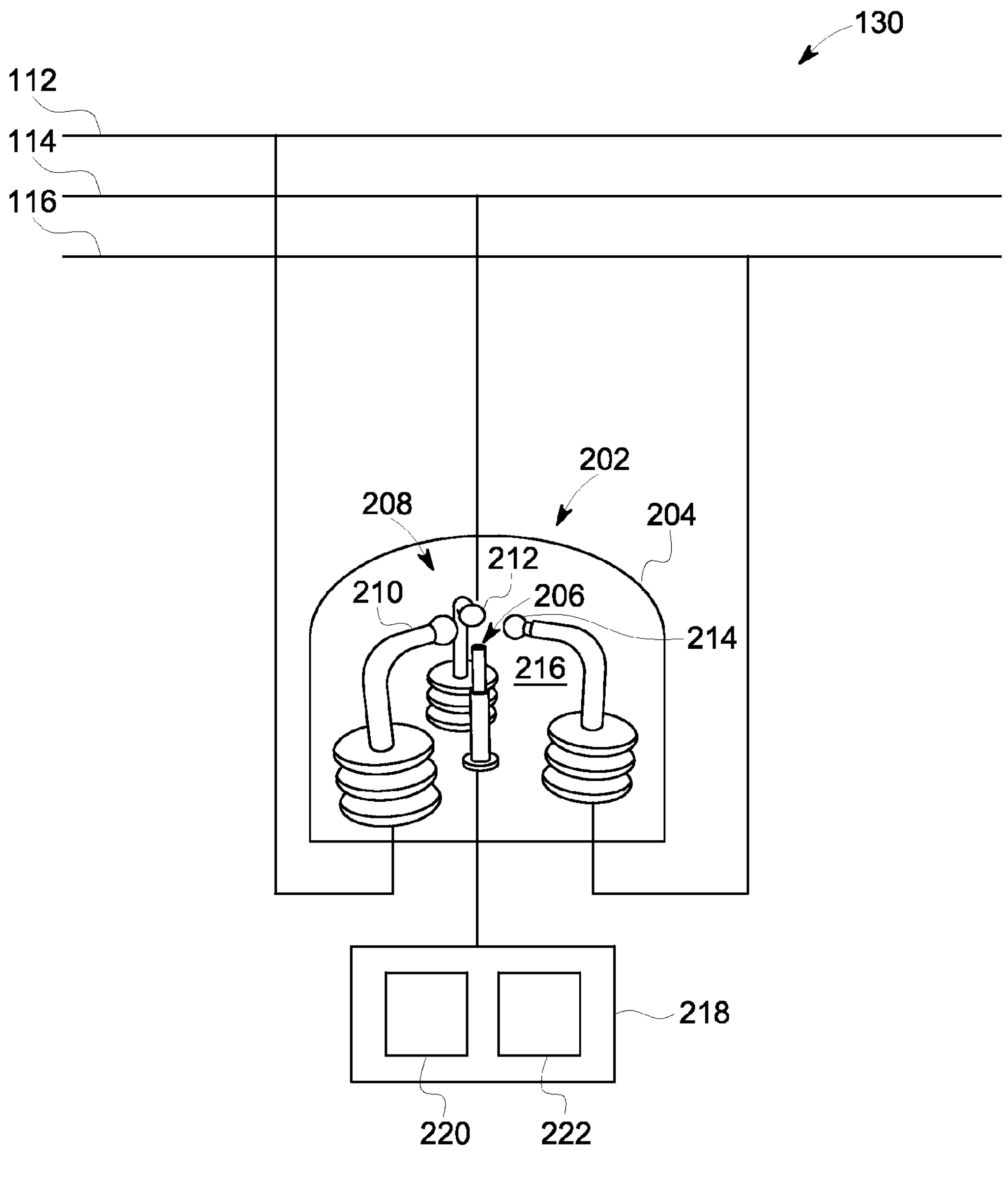
FIG. 2 is a schematic diagram of an exemplary arc mitigation system that may be used with the power distribution system shown in FIG. 1.

FIG. 2 is a schematic diagram of an exemplary arc mitigation system 130 that may be used with power distribution system 100 (shown in FIG. 1). In an exemplary embodiment, arc mitigation system 130 includes an arc mitigation device 202.

In an exemplary embodiment, arc mitigation device 202 is communicatively coupled to controller 122 and is controlled by controller 122. Arc mitigation device 202 includes one or more containment chambers 204 that enclose a plasma generation device 206 (sometimes referred to as a "plasma gun") and a plurality of electrodes 208, such as a first phase electrode 210, a second phase electrode 212, and a third phase electrode 214. More specifically, first phase electrode 210, second phase electrode 212, third phase electrode 214, and plasma generation device 206 are positioned within a cavity 216 defined within containment chamber 204. First phase electrode 210 is coupled to first phase conductor 112, second phase electrode 212 is coupled to second phase conductor 114, and third phase electrode 214 is coupled to third phase conductor 116. In an exemplary embodiment, plasma generation device 206 is a star-configured longitudinal plasma generation device. Alternatively, plasma generation device 206 is configured in any other suitable manner that enables plasma generation device 206 to function as described herein.

In an exemplary embodiment, a trigger circuit 218 is coupled to arc mitigation device 202, and more specifically, to plasma generation device 206, to activate plasma generation device 206. More specifically, trigger circuit 218 receives the activation signal from controller 122 and energizes plasma generation device with a voltage signal and/or a current signal. In an exemplary embodiment, trigger circuit 218 is a dual-source circuit that includes a voltage source 220 and a current source 222. In response to the activation signal, voltage source 220 applies a voltage across the electrodes (not shown) of plasma generation device 206 such that an electrical breakdown of entrapped air and/or other insulative material disposed between the plasma generation device electrodes occurs. In response to the activation signal, current source 222 facilitates producing a flow of high magnitude current, or a high magnitude current pulse, (e.g., between about 1 kiloamperes (kA) and about 10 kA, in one embodiment) having a duration of between about 10 microseconds and about 100 microseconds across the plasma generation device electrodes. The high magnitude current flow within plasma generation device 206 causes high-density ablative plasma to be generated within plasma generation device 206. Plasma generation device 206 is designed to direct or discharge the generated ablative plasma between electrodes 208. In an exemplary embodiment, trigger circuit 218 is positioned outside of containment chamber 204 and is coupled to plasma generation device 206 by a plurality of plasma generation device conductors (not shown in FIG. 2). Alternatively, trigger circuit 218 is positioned within containment chamber 204.

During operation, if an arc flash event 120 occurs, controller 122 (both shown in FIG. 1) transmits an activation signal to plasma generation device 206, and plasma generation device 206 emits ablative plasma into gaps between electrodes 208. The ablative plasma "breaks down," or reduces the dielectric strength of, air or other insulative material between electrodes 208, and causes a low impedance path for current to travel between electrodes 208. The low impedance path has a lower effective impedance than an effective impedance associated with arc flash event 120. Plasma generation device 206 therefore causes the first phase of current to be electrically coupled to the second phase of current, the second phase of current to be electrically coupled to the third phase of current, and/or the third phase of current to be electrically coupled to the first phase of current. Accordingly, current is directed away from arc flash event 120 to electrodes 208 such that an arc is formed between electrodes 208. The energy of arc flash event 120 is discharged, therefore, within containment chamber 204, thus mitigating the otherwise undesired consequences of arc flash event 120 within equipment protection system 118 and/or power distribution system 100.

The arc or arcs generated within containment chamber 204 (i.e., within cavity 216) may cause air or other gases within cavity 216 to be expanded rapidly causing the gases to be heated and increase in pressure. In addition, electrodes 208 may at least partially erode and cause metal shrapnel to be formed. As described more fully herein, plasma generation device 206 is substantially sealed, or airtight, such that the heated gases surrounding plasma generation device 206 are prevented from entering, or flowing through, plasma generation device 206. Rather, the heated gases are discharged through vents (not shown) of containment chamber 204. Accordingly, the large amount of energy that may be present during an arc flash event 120 may be discharged within containment chamber 204 rather than being discharged in an unrestrained manner at the site of arc flash event 120. The safety of equipment protection system 118 and/or power distribution system 100 is facilitated to be increased, and damage to components of equipment protection system 118 and/or power distribution system 100 from arc flash event 120 is facilitated to be reduced.

Figure 3:
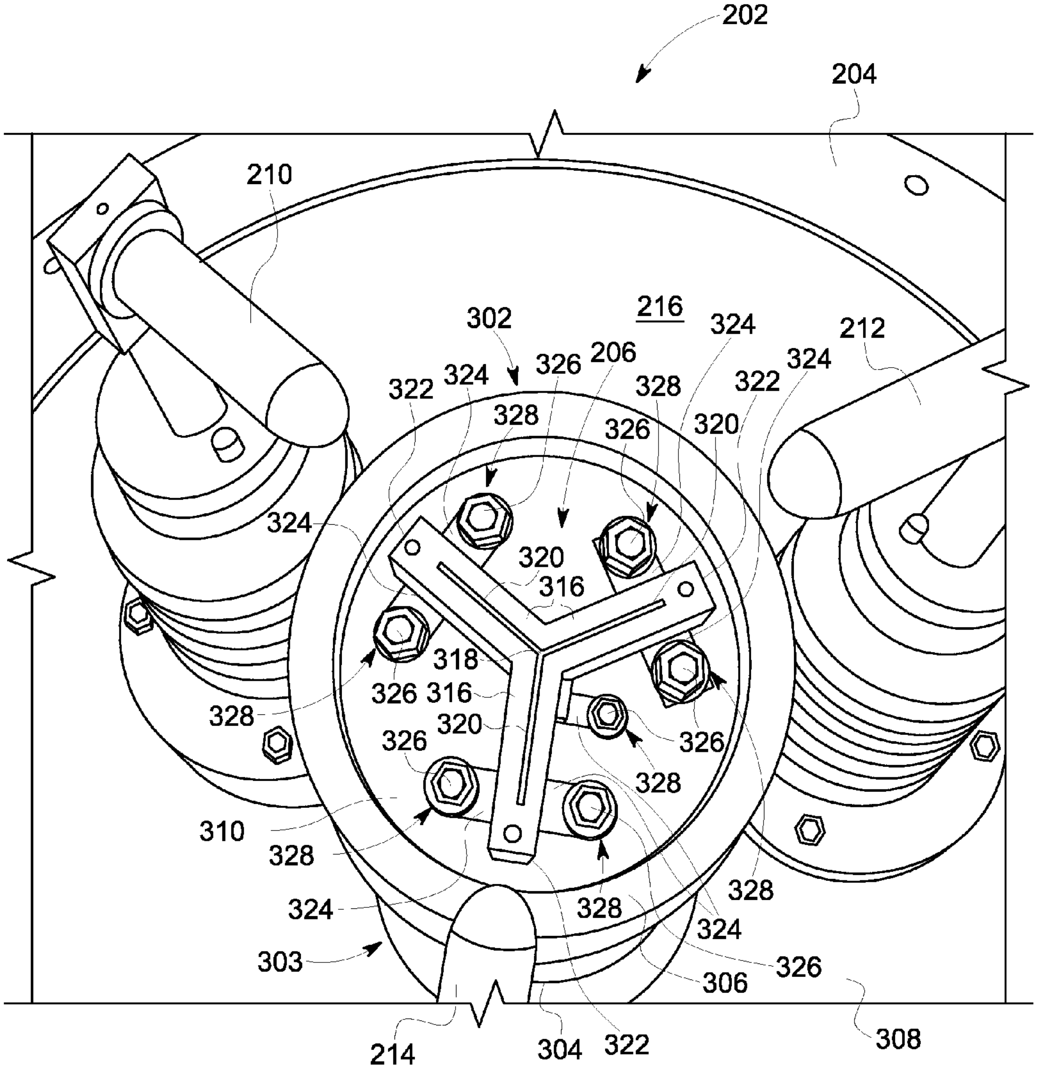
FIG. 3 is a perspective top view of an exemplary arc mitigation device including a plasma generation device assembly that may be used with the power distribution system shown in FIG. 1.
Figure 4:
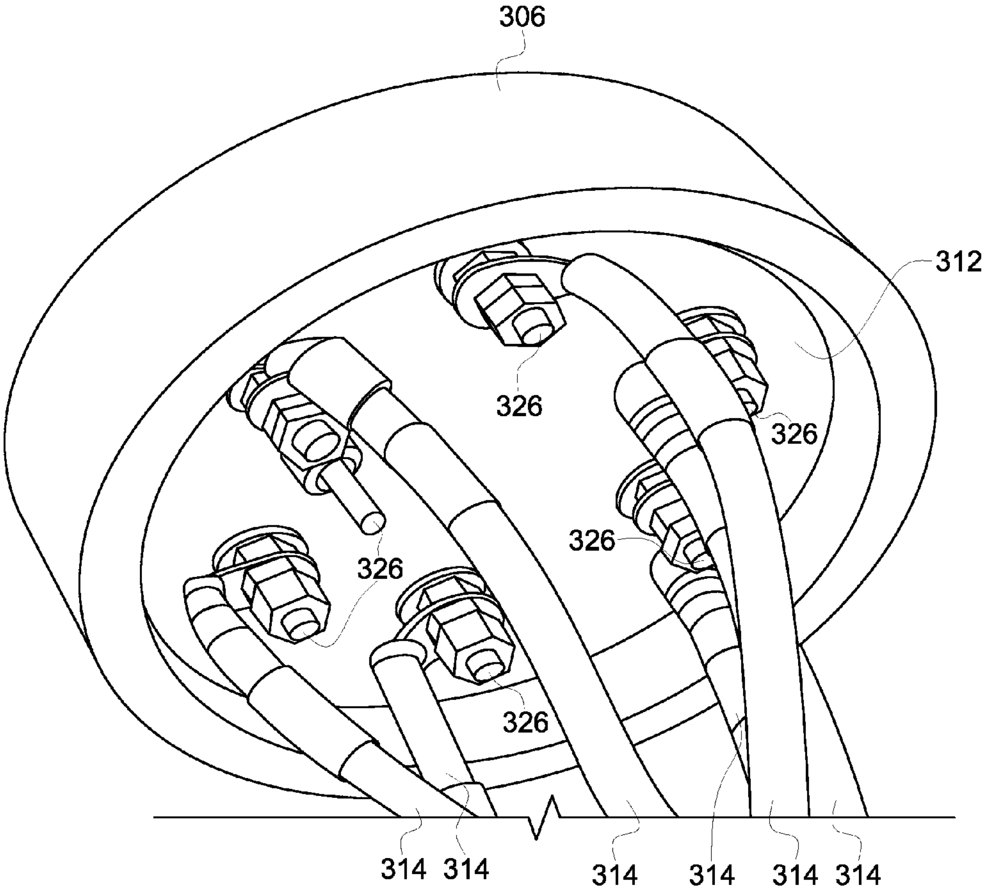
FIG. 4 is a perspective bottom view of a portion of the plasma generation device assembly shown in FIG. 3.

FIG. 3 is a perspective top view of an exemplary arc mitigation device 202 including a plasma generation device assembly 302 that may be used with power distribution system 100 (shown in FIG. 1). FIG. 4 is a perspective bottom view of a portion of plasma generation device assembly 302. In an exemplary embodiment, plasma generation device assembly 302 is positioned with respect to first phase electrode 210, second phase electrode 212, and third phase electrode 214 of arc mitigation device 202.

Plasma generation device assembly 302 includes plasma generation device 206 and a base 303. Base 303 includes a pedestal 304 and a cap 306 that is coupled to pedestal 304. More specifically, cap 306 is sealingly coupled to pedestal 304 to prevent gases, such as air, from entering an interior portion defined within cap 306 and/or pedestal 304 from cavity 216 surrounding plasma generation device 206.

Pedestal 304 is positioned within cavity 216 and is coupled to a base 308 of containment chamber 204. Cap 306 is coupled to pedestal, and cap 306 includes a top surface 310 (shown in FIG. 3) and a bottom surface 312 (shown in FIG. 4). More specifically, cap 306 is coupled to pedestal 304 at, or adjacent to, bottom surface 312 by, for example, gluing, snap fitting, bolting, and/or screwing cap 306 onto pedestal 304. In an exemplary embodiment, cap 306 is threadably coupled to (i.e., screwed onto) pedestal 304 to enable cap 306 to be raised, lowered, and/or aligned with respect to pedestal 304.

In an exemplary embodiment, pedestal 304 is substantially hollow to enable a plurality of plasma generation device conductors 314 to extend through pedestal 304 for coupling to trigger circuit 218 (shown in FIG. 2). In an exemplary embodiment, pedestal 304 and cap 306 are manufactured from an insulative material, such as polytetrafluoroethylene or a polyamide material such as nylon or a composite material (i.e., a combination of metal and polymer). Alternatively, pedestal 304 and/or cap 306 are manufactured from any other suitable material that has high dielectric properties, arc resistance, structural strength, thermal strength, and/or low flammability.

Referring to FIG. 3, plasma generation device 206 is coupled to top surface 310 of cap 306 such that plasma generation device 206 extends into, and is open to, cavity 216. Plasma generation device 206 includes a plurality of arms 316 extending outward from a center 318 of plasma generation device 206 to form a substantially triangular, or star, shape. A slot 320 is formed within each arm 316, and each slot 320 extends from center 318 towards an end 322 of an associated arm 316. In an exemplary embodiment, ablative plasma generated during the operation of plasma generation device 206 is discharged through slots 320 into cavity 216, towards first phase electrode 210, second phase electrode 212, and third phase electrode 214.

In an exemplary embodiment, arms 316 are manufactured from one or more plates or layers of ablative material, such as an ablative polymer, and/or any other material that enables arc mitigation device 202 to function as described herein. At least a portion of the ablative material of arms 316 is ablated and discharged towards first phase electrode 210, second phase electrode 212, and/or third phase electrode 214 when an arc flash event 120 is detected, as described more fully herein.

Plasma generation device 206 includes a plurality of terminals 324 extending from plasma generation device arms 316. More specifically, in an exemplary embodiment, a pair of plasma generation device terminals 324 is coupled to each arm 316 to provide a voltage differential or bias for each arm 316. In an exemplary embodiment, the pairs of plasma generation device terminals 324 are coupled to current source 222 (shown in FIG. 2) by plasma generation device conductors 314. In addition, at least one plasma generation device terminal 324 is coupled to voltage source 220 (shown in FIG. 2) by at least one plasma generation device conductor 314. Each plasma generation device terminal 324 is also coupled to cap 306 by a coupling member 326 such that plasma generation device 206 is coupled to cap 306 by coupling members 326.

In an exemplary embodiment, coupling members 326 include, without limitation, one or more bolts, nuts, studs, pins, screws, and/or any other component that enables terminals 324 to be coupled to cap 306. Coupling members 326 are inserted through apertures or openings 328 defined in cap 306 such that coupling members 326 (and openings 328) extend from top surface 310 to bottom surface 312. In an exemplary embodiment, openings 328 are tapped openings that enable coupling members 326 to be aligned with plasma generation device conductors 314 during assembly of plasma generation device 206. In addition, a cross slot is included at the top of coupling members 326 to enable coupling members 326 to be aligned with plasma generation device conductors 314 and/or plasma generation device terminals 324.

In one embodiment, coupling members 326 removably couple terminals 324 to cap 306 such that plasma generation device 206 may be conveniently removed without requiring disassembly of plasma generation device 206. For example, plasma generation device 206 may be removed and/or replaced by unscrewing or otherwise disconnecting plasma generation device terminals 324 from coupling members 326 while cap 306 remains attached to pedestal 304 and while plasma generation device conductors 314 remain connected to coupling members 326. In addition, coupling members 326 substantially seal openings 328 when coupling members 326 are inserted therethrough to sealingly couple terminals 324 and plasma generation device 206 to cap 306. Accordingly, air or other gases within cavity 216 are prevented from entering, or flowing through, openings 328 in cap 306. In an exemplary embodiment, coupling members 326 also are maintained in a position separate from each other (e.g., each coupling member 326 is maintained in a position that is substantially parallel to each other coupling member 326). Accordingly, the position of coupling members 326 facilitates preventing coupling members 326 from contacting each other, thus reducing a likelihood that a short circuit will occur at plasma generation device 206 and increasing a reliability of plasma generation device 206.

In addition, in an exemplary embodiment, coupling members 326 (and openings 328 in cap 306) are threaded or otherwise formed to enable plasma generation device 206 to be raised or lowered with respect to cap 306 while maintaining sealed openings 328, or to be replaced without removing cap 306. Accordingly, a distance between plasma generation device 206 and first phase electrode 210, second phase electrode 212, and/or third phase electrode 214 may be adjusted by adjusting (e.g., screwing or unscrewing) coupling members 326 within openings 328 of cap 306.

Referring to FIG. 4, plasma generation device conductors 314 are coupled to plasma generation device 206 by coupling members 326. More specifically, a plasma generation device conductor 314 is coupled to each plasma generation device terminal 324 by a coupling member 326 at bottom surface 312 of cap 306. Each plasma generation device conductor 314 extends through pedestal 304 and is coupled to trigger circuit 218. Accordingly, plasma generation device conductors 314 are protected, by pedestal 304, from hot gases and/or arcs formed within cavity 216.

Figure 5:
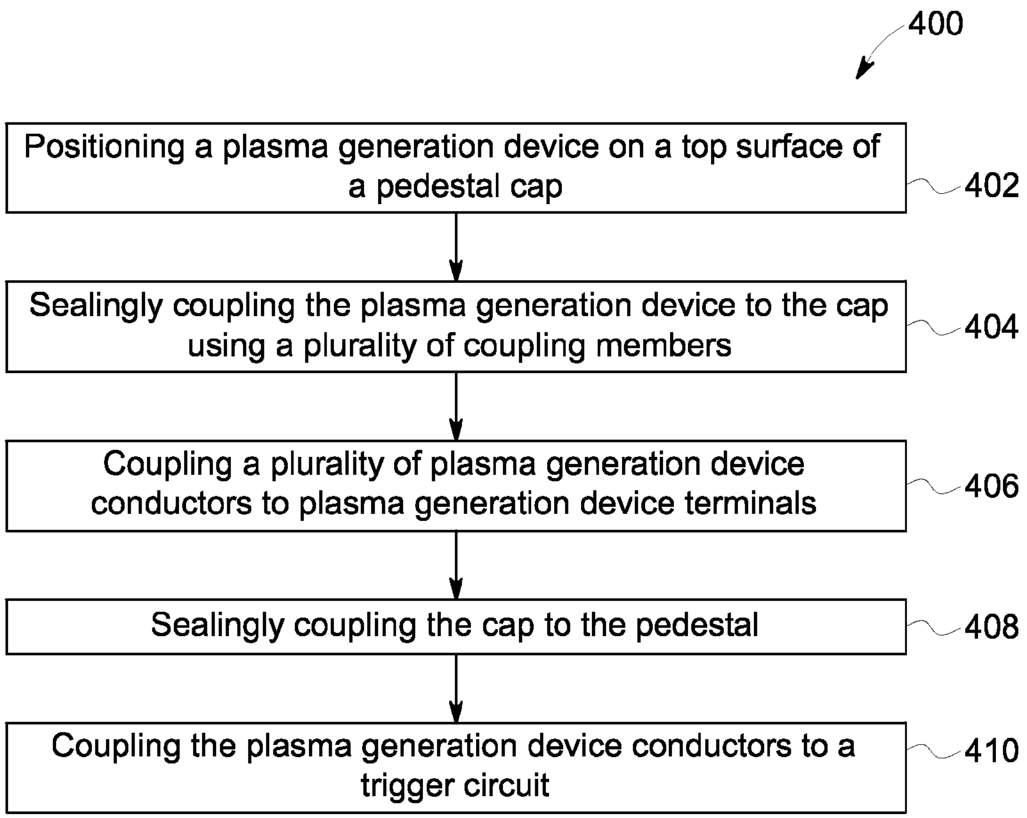
FIG. 5 is a flow diagram of an exemplary method of assembling a portion of an arc mitigation device that may be used to assemble the plasma generation device assembly shown in FIGS. 3 and 4.

FIG. 5 is a flowchart of an exemplary method 400 of assembling at least a portion of an arc mitigation device, such as arc mitigation device 202 (shown in FIG. 2). For example, method 400 may be used to assemble plasma generation device assembly 302 (shown in FIGS. 3 and 4).

Method 400 includes positioning 402 a plasma generation device, such as plasma generation device 206 (shown in FIG. 2), on a top surface 310 of a pedestal cap 306. Accordingly, plasma generation device 206 is exposed to, or extends into, cavity 216.

Plasma generation device 206 is sealingly coupled 404 to cap 306 using a plurality of coupling members 326. More specifically, coupling members 326 are inserted through opening 328 defined within cap 306 to seal openings 328. In one embodiment, coupling members 326 and openings 328 are threaded or otherwise suitably formed to enable plasma generation device 206 to be raised or lowered with respect to cap 306.

A plurality of plasma generation device conductors 314 are coupled 406 to a plurality of terminals 324 of plasma generation device 206. Plasma generation device conductors 314 are extended through pedestal 304, and cap 306 is sealingly coupled 408 to pedestal 304. Plasma generation device conductors 314 are coupled 410 to a trigger circuit 218 to enable trigger circuit 218 to activate plasma generation device 206 in response to a detected arc flash event 120.

Figure 6:
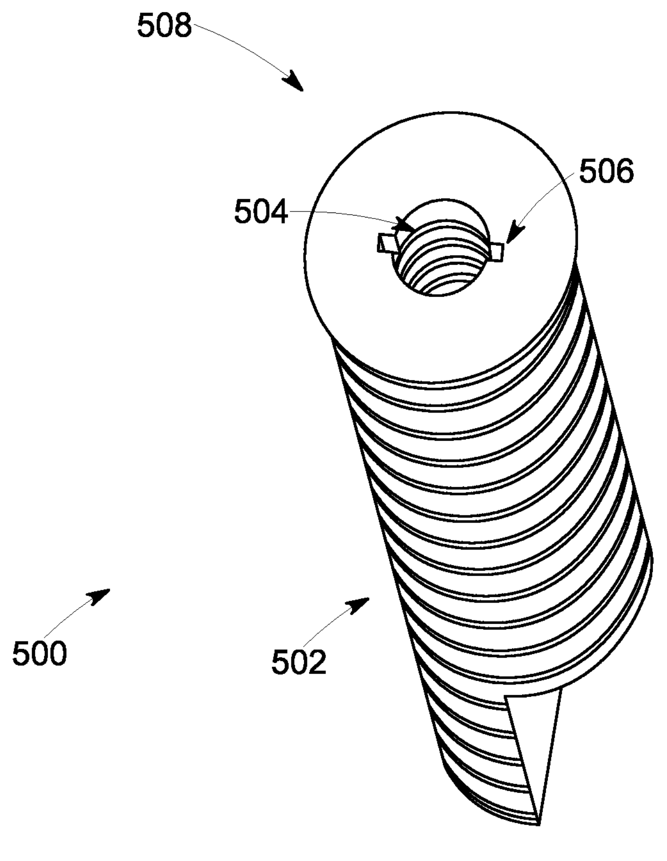
FIG. 6 is a perspective view of an exemplary coupling member that may be used with the plasma generation device assembly shown in FIGS. 3 and 4.

FIG. 6 is a perspective view of an exemplary coupling member 500, such as coupling member 326 (shown in FIG. 3), that may be used with plasma generation device assembly 302 (shown in FIG. 3). In the exemplary embodiment, each coupling member 500 includes a threaded exterior 502 that threadably engages with an opening 328 (shown in FIG. 3) of cap 306. Each coupling member 500 also includes a threaded interior 504 that receives a bolt, a screw, and/or any other suitable device or component that enables coupling member 500 to be coupled to plasma generation device electrodes or terminals 324 (shown in FIG. 4).

In addition, a cross slot 506 is defined in a top portion 508 of each coupling member 500 to enable coupling member 500 to be adjusted with respect to plasma generation device 206 and/or with respect to top surface 310 of cap 306. For example, a screwdriver or another tool may be inserted into cross slot 506 to rotate coupling member 500, thus causing coupling member 500 and/or plasma generation device 206 to be raised or lowered with respect to top surface 310. It should be recognized that, while cross slot 506 is illustrated in FIG. 6 as being substantially slot-shaped (i.e., substantially rectangular), cross slot 506 may have any suitable shape and/or configuration that enables coupling member 500 to function as described herein.

Exemplary embodiments of a plasma generation device assembly, an arc mitigation device, and a method of assembling a plasma generation device assembly are described above in detail. The plasma generation device assembly, arc mitigation device, and method are not limited to the specific embodiments described herein but, rather, steps of the method and/or components of the plasma generation device assembly and/or arc mitigation device may be utilized independently and separately from other steps and/or components described herein. Further, the described steps and/or components may also be defined in, or used in combination with, other systems, methods, and/or devices, and are not limited to practice with only the systems and method as described herein.

Although the present invention is described in connection with an exemplary power distribution system, embodiments of the invention are operational with numerous other power systems, or other systems or devices. The power distribution system described herein is not intended to suggest any limitation as to the scope of use or functionality of any aspect of the invention. In addition, the power distribution system described herein should not be interpreted as having any dependency or requirement relating to any one or combination of components illustrated in the exemplary operating environment.

The order of execution or performance of the steps in the embodiments of the invention illustrated and described herein is not essential, unless otherwise specified. That is, the steps may be performed in any order, unless otherwise specified, and embodiments of the invention may include additional or fewer steps than those disclosed herein. For example, it is contemplated that executing or performing a particular step before, contemporaneously with, or after another step is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A plasma generation device assembly for use in an arc mitigation device having a containment chamber, said plasma generation device assembly comprising:

a base comprising an interior portion and a top surface defining a plurality of apertures that extend through said top surface;

a plasma generation device configured to emit ablative plasma when said plasma generation device is activated, said plasma generation device comprising a plurality of arms formed from an ablative material; and a plurality of coupling members extending through the plurality of apertures and configured to couple said plasma generation device to said top surface.

2. A plasma generation device assembly in accordance with claim 1, wherein said plurality of coupling members are configured to seal the apertures such that gases proximate said plasma generation device are prevented from flowing through the apertures into said interior portion.

3. A plasma generation device assembly in accordance with claim 1, wherein said base comprises a cap and a pedestal, said cap is sealingly coupled to said pedestal such that gases proximate said plasma generation device are prevented from flowing into said pedestal when said cap is coupled to said pedestal.

4. A plasma generation device assembly in accordance with claim 3, further comprising a plurality of plasma generation device conductors coupled to said plasma generation device by said coupling members.

5. A plasma generation device assembly in accordance with claim 4, wherein said plurality of plasma generation device conductors extends through said pedestal.

6. A plasma generation device assembly in accordance with claim 1, wherein at least one slot is formed within said plasma generation device to enable said plasma generation device to discharge ablative plasma through the at least one slot.

7. A plasma generation device assembly in accordance with claim 3, wherein said plasma generation device is configured to be raised and lowered with respect to said base and configured to be replaced without removing said cap.

8. A plasma generation device assembly in accordance with claim 7, wherein said plurality of coupling members are formed to enable said plasma generation device to be raised and lowered with respect to said base.

9. An arc mitigation device for use in discharging energy from an electrical event, said arc mitigation device comprising:

a containment chamber;

a plurality of electrodes positioned within said containment chamber; and a plasma generation device assembly positioned within said containment chamber, said plasma generation device assembly comprising:

a base comprising an interior portion and a top surface defining a plurality of apertures that extend through said top surface;

a plasma generation device configured to emit ablative plasma such that an electrical arc is enabled to be formed between at least two of said plurality of electrodes to divert energy from the electrical event, wherein at least one slot is formed within said plasma generation device to enable said plasma generation device to discharge ablative plasma through the at least one slot; and a plurality of coupling members extending through the plurality of apertures and configured to couple said plasma generation device to said top surface.

10. An arc mitigation device in accordance with claim 9, wherein said plurality of coupling members are configured to seal the apertures such that gases proximate said plasma generation device are prevented from flowing through the apertures into said interior portion.

11. An arc mitigation device in accordance with claim 9, wherein said plasma generation device comprises a plurality of arms formed from an ablative material.

12. An arc mitigation device in accordance with claim 9, wherein said base comprises a cap and a pedestal, said cap is sealingly coupled to said pedestal such that gases proximate said plasma generation device are prevented from flowing into said pedestal when said cap is coupled to said pedestal.

13. An arc mitigation device in accordance with claim 12, further comprising a plurality of plasma generation device conductors coupled to said plasma generation device by said coupling members.

14. An arc mitigation device in accordance with claim 13, wherein said plurality of plasma generation device conductors extends through said pedestal.

15. An arc mitigation device in accordance with claim 9, wherein said plasma generation device is configured to be raised and lowered with respect to said base.

16. An arc mitigation device in accordance with claim 15, wherein said plurality of coupling members are threaded to enable said plasma generation device to be raised and lowered with respect to said cap.

17. A method of assembling a plasma generation device assembly for use in an arc mitigation device having a containment chamber, said method comprising:

positioning a plasma generation device on a top surface of a base including an interior portion, a pedestal, and a cap, wherein the top surface is defined by the cap, and the top surface defines a plurality of apertures extending through the top surface, wherein the plasma generation device includes a plurality of terminals and is configured to emit ablative plasma when the plasma generation device is activated;

sealingly coupling the plasma generation device to the top surface of the cap using a plurality of coupling members such that the plurality of coupling members extends through the plurality of apertures;

coupling a plurality of plasma generation device conductors to the plurality of terminals; and sealingly coupling the cap to the pedestal such that gases proximate the plasma generation device are prevented from entering the pedestal.

18. A method in accordance with claim 17, further comprising coupling the plurality of plasma generation device conductors to a trigger circuit to enable the plasma generation device to be activated by the trigger circuit, wherein the plasma generation device is configured to discharge ablative plasma when the plasma generation device is activated.

* * * * *